US008162177B2

(12) United States Patent
Ziesel

(10) Patent No.: US 8,162,177 B2
(45) Date of Patent: Apr. 24, 2012

(54) DISPENSING NOZZLE ASSEMBLY

(75) Inventor: Lawrence B. Ziesel, Woodstock, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 12/917,673

(22) Filed: Nov. 2, 2010

(65) Prior Publication Data

US 2011/0045161 A1 Feb. 24, 2011

Related U.S. Application Data

(62) Division of application No. 11/782,833, filed on Jul. 25, 2007, now Pat. No. 7,866,509.

(51) Int. Cl.
*A23L 2/60* (2006.01)

(52) U.S. Cl. ... 222/1; 222/145.1; 222/145.5; 222/129.1; 426/519; 426/590

(58) Field of Classification Search ........... 222/1, 145.1, 222/145.5, 630, 129.1; 426/519, 590; 239/10, 239/418
See application file for complete search history.

(56) References Cited

U.S. PATENT DOCUMENTS 2,493,660 A * 1/1950 Elkins ........................... 222/133
2,880,912 A * 4/1959 Fisher ........................ 222/129.4
3,580,425 A * 5/1971 DeMan ...................... 222/129.1
4,211,342 A 7/1980 Jamgochian et al.
4,218,014 A * 8/1980 Tracy ............................ 239/106
4,392,588 A 7/1983 Scalera
4,509,690 A * 4/1985 Austin et al. .................. 239/429
4,619,378 A 10/1986 de Man
4,753,370 A * 6/1988 Rudick ......................... 222/105
4,808,346 A * 2/1989 Strenger ...................... 261/18.1
4,821,925 A 4/1989 Wiley et al.
4,928,854 A 5/1990 McCann et al.
4,986,447 A 1/1991 McCann et al.
5,000,357 A 3/1991 Shannon et al.
5,033,648 A 7/1991 Nakayama et al.
5,033,651 A 7/1991 Whigham et al.
5,048,726 A 9/1991 McCann et al.
5,203,474 A * 4/1993 Haynes ...................... 222/129.1
5,415,326 A 5/1995 Durham et al.
5,473,909 A 12/1995 Kateman et al.
5,603,257 A 2/1997 Kateman et al.
5,649,644 A 7/1997 Hashimoto et al.
5,685,639 A * 11/1997 Green ........................... 366/101
5,706,661 A * 1/1998 Frank ............................... 62/70
5,803,320 A 9/1998 Cutting et al.
6,047,859 A 4/2000 Schroeder et al.
6,098,842 A 8/2000 Schroeder et al.
6,173,862 B1 1/2001 Buca et al.

(Continued)

FOREIGN PATENT DOCUMENTS

AT 381482 8/1984

(Continued)

*Primary Examiner* — Kevin P Shaver
*Assistant Examiner* — Donnell Long
(74) *Attorney, Agent, or Firm* — Sutherland Asbill & Brennan LLP

(57) ABSTRACT

A dispensing nozzle assembly for dispensing a number of micro-ingredients into a fluid stream. The dispensing nozzle assembly may include a micro-ingredient mixing chamber, a number of micro-ingredient lines in communication with the micro-ingredient mixing chamber such that the micro-ingredients mix therein, and a mixed micro-ingredient exit such the mixed micro-ingredients are dispensed into the fluid stream.

12 Claims, 8 Drawing Sheets

U.S. PATENT DOCUMENTS

| | | | | |
|---|---|---|---|---|
| 6,223,948 | B1 * | 5/2001 | Davis | 222/132 |
| 6,253,963 | B1 | 7/2001 | Tachibana | |
| 6,321,938 | B1 | 11/2001 | Edwards et al. | |
| 6,345,729 | B1 | 2/2002 | Santy, Jr. | |
| 6,364,159 | B1 | 4/2002 | Newman et al. | |
| 6,616,014 | B1 * | 9/2003 | Pozniak et al. | 222/129.3 |
| 6,669,053 | B1 | 12/2003 | Garson et al. | |
| 6,952,928 | B2 * | 10/2005 | Kateman et al. | 62/71 |
| 7,077,290 | B2 | 7/2006 | Bethuy et al. | |
| 7,108,024 | B2 | 9/2006 | Navarro | |
| 7,108,156 | B2 | 9/2006 | Fox | |
| 7,147,131 | B2 | 12/2006 | Sher et al. | |
| 7,156,115 | B2 | 1/2007 | Everett et al. | |
| 7,156,259 | B2 | 1/2007 | Bethuy et al. | |
| 7,159,743 | B2 | 1/2007 | Brandt et al. | |
| 7,164,966 | B2 | 1/2007 | Sudolcan | |
| 7,168,593 | B2 | 1/2007 | Schroeder et al. | |
| 7,243,818 | B2 | 7/2007 | Jones | |
| 7,290,680 | B2 | 11/2007 | Henry et al. | |
| 7,445,133 | B2 * | 11/2008 | Ludovissie et al. | 222/145.5 |
| 7,487,887 | B2 * | 2/2009 | Ziesel | 222/129.1 |
| 7,578,415 | B2 * | 8/2009 | Ziesel et al. | 222/129.1 |
| 7,757,896 | B2 * | 7/2010 | Carpenter et al. | 222/129.4 |
| 2004/0040983 | A1 | 3/2004 | Ziesel | |
| 2005/0269360 | A1 | 12/2005 | Piatnik et al. | |
| 2006/0174778 | A1 | 8/2006 | Greiwe | |
| 2006/0196886 | A1 | 9/2006 | Fox | |
| 2006/0213928 | A1 | 9/2006 | Ufheil et al. | |
| 2006/0214027 | A1 * | 9/2006 | Micheli | 239/418 |
| 2007/0009365 | A1 | 1/2007 | Litterst et al. | |
| 2007/0062722 | A1 | 3/2007 | Tanaka et al. | |
| 2007/0080169 | A1 | 4/2007 | Sher et al. | |
| 2007/0131715 | A1 | 6/2007 | Minard et al. | |
| 2008/0093382 | A1 | 4/2008 | Sher et al. | |
| 2009/0230149 | A1 * | 9/2009 | Smeller et al. | 222/145.5 |
| 2010/0224649 | A1 | 9/2010 | Hoover | |

FOREIGN PATENT DOCUMENTS

| | | | |
|---|---|---|---|
| DE | 3709155 | A1 | 10/1987 |
| EP | 0158096 | A2 | 3/1985 |
| EP | 0672616 | A2 | 3/1995 |
| GB | 2429694 | | 7/2007 |
| JP | 09134481 | | 5/1997 |
| WO | 9850165 | A1 | 11/1998 |
| WO | 0007928 | A1 | 2/2000 |
| WO | 2006/012916 | | 2/2006 |
| WO | 2006/024409 | A2 | 3/2006 |
| WO | 2007/002575 | | 1/2007 |

* cited by examiner

DISPENSING NOZZLE ASSEMBLY

RELATED APPLICATIONS

The present application is a divisional of U.S. patent application Ser. No. 11/782,833, filed on Jul. 25, 2007, now allowed. U.S. patent application Ser. No. 11/782,833 is incorporated by reference herein in full.

TECHNICAL FIELD

The present application relates generally to nozzles for beverage dispensers and more particularly relates to multi-flavor or multi-fluid dispensing nozzles.

BACKGROUND OF THE INVENTION

Current post-mix beverage dispenser nozzles generally mix streams of syrup, concentrate, sweetener, bonus flavors, other types of flavoring, and other ingredients with water or other types of diluent by flowing the syrup stream down the center of the nozzle with the water stream flowing around the outside. The syrup stream is directed downward with the water stream such that the streams mix as they fall into a cup.

There is a desire for a beverage dispensing system as a whole to provide as many different types and flavors of beverages as may be possible in a footprint that may be as small as possible. Preferably, such a beverage dispensing system can provide as many beverages as may be available on the market in prepackaged bottles or cans.

In order to accommodate this variety, the dispensing nozzles themselves need to accommodate fluids with different viscosities, flow rates, mixing ratios, temperatures, and other variables. Current nozzles may not be able to accommodate multiple beverages with a single nozzle design and/or the nozzle may be designed for specific types of fluid flow. One known means of accommodating differing flow characteristics is shown in commonly owned U.S. patent application Ser. No. 10/233,867 (U.S. Publication Number U.S. 2004/0040983A1) that shows the use of replaceable fluid modules that are sized and shaped for specific flow characteristics. U.S. patent application Ser. No. 10/233,867 is incorporated herein by reference. Even more variety and fluid streams may be employed in commonly owned U.S. patent application Ser. No. 11/276,551 that shows the use of a number of tertiary flow assemblies. U.S. patent application Ser. No. 11/276,551 also is incorporated herein by reference.

There is a desire, however, for a dispensing nozzle to accommodate even more and different types of fluids that may pass therethrough. The dispensing nozzle preferably should be able to accommodate this variety while still providing good mixing and easy cleaning.

SUMMARY OF THE INVENTION

The present application thus describes a dispensing nozzle assembly for dispensing a number of micro-ingredients into a fluid stream. The dispensing nozzle assembly may include a micro-ingredient mixing chamber, a number of micro-ingredient lines in communication with the micro-ingredient mixing chamber such that the micro-ingredients mix therein, and a mixed micro-ingredient exit such the mixed micro-ingredients are dispensed into the fluid stream.

The micro-ingredients may include an acid component and a non-acid component. The micro-ingredients may include a number of beverage components such as beverage bases, flavors, additives, and/or nonnutritive ingredients.

The dispensing nozzle assembly further may include a number of micro-ingredient mixing chambers. The micro-ingredient mixing chambers may be positioned within an injector ring. The injector ring may include a number of removable parts. The injector ring may include a number of injector ports in communication with the micro-ingredient mixing chambers. The injector ports may be in communication with the micro-ingredient lines via a number of tube assemblies. The tube assemblies may include a number of quad tube assemblies.

The micro-ingredients lines may include substantially clear micro-ingredients therein. The clear micro-ingredients may be positioned about a rear of the injector ring and the dark micro-ingredients may be positioned about a front of the injector ring. The micro-ingredient mixing chamber may include a top channel in communication with the micro-ingredient lines and a mixing area. The micro-ingredient mixing chamber may include a gasket therein.

The present application further describes a method of mixing a number of beverage components. The method may include mixing a number of beverage base components to form a mixed base stream, mixing a diluent stream and a sweetener stream to form a diluted sweetener stream, and mixing the mixed base stream and the diluted sweetener stream.

The beverage base components may include an acid and a non-acid component. The beverage base components may include flavorings and/or additives. The method further may include mixing a further diluent stream with the diluted sweetener stream.

The present application further describes a dispensing nozzle assembly for mixing a sweetener stream and a diluent stream. The dispensing nozzle assembly may include a sweetener path, a diluent path, and a diversion path between the sweetener path and the diluent path for a partial volume of the diluent stream to mix with the sweetener stream to form a diluted sweetener stream such that the diluent stream and the diluted sweetener stream exit the assembly.

The dispensing nozzle assembly further may include a main body. The main body may include the sweetener path and the diluent path therethrough. The diluent path may include an annular chamber. The dispensing nozzle assembly further may include a flow director. The flow director may include a number of diluent stream apertures and a number of diluted sweetener stream apertures such that the diluent stream and the diluted sweetener stream exit the assembly therethrough. The flow director may include a target for mixing.

The sweetener stream may include a high fructose corn syrup stream. The high fructose corn syrup stream may include a concentration above about sixty-five percent (about 65%). The partial volume of the diluent stream dilutes the sweetener stream by about five percent (about 5%) to twenty percent (20%) or more. The diluted sweetener stream may include a diluted high fructose corn syrup stream. The diluted high fructose corn syrup stream may include a concentration of less than about sixty-five percent (about 65%).

The present application further describes a method for mixing a sweetener stream and a diluent stream. The method may include flowing the sweetener stream, flowing the diluent stream, diverting a partial volume of the diluent stream to the sweetener stream to form a diluted sweetener stream, and mixing the diluent stream and the diluted sweetener stream.

The sweetener stream may include a high fructose corn syrup stream. The high fructose corn syrup stream may include a concentration above about sixty-five percent (about 65%). The partial volume of the diluent stream dilutes the sweetener stream by about five percent (about 5%) to about twenty percent (20%) or more. The diluted sweetener stream may include a diluted high fructose corn syrup stream. The diluted high fructose corn syrup stream may include a concentration of less than about sixty-five percent (about 65%).

The present application further describes a dispensing nozzle assembly for forming a beverage from a number of micro-ingredient streams, a macro-ingredient stream, and a diluent stream. The dispensing nozzle assembly may include a nozzle tip assembly for the macro-ingredient stream and the diluent stream. The nozzle tip assembly may include a target such that the macro-ingredient stream and the diluent stream flow down the target. The dispensing nozzle assembly also may include an injector ring assembly positioned about the nozzle tip assembly. The injector ring assembly may include a number of cavities therein to mix two or more of the micro-ingredient streams to form a mixed stream and to direct the mixed stream towards the target.

These and other features of the present application will become apparent to one of ordinary skill in the art upon review of the following detailed description when taken in conjunction with the several drawings and the appended claims.

DETAILED DESCRIPTION

Figure 2:
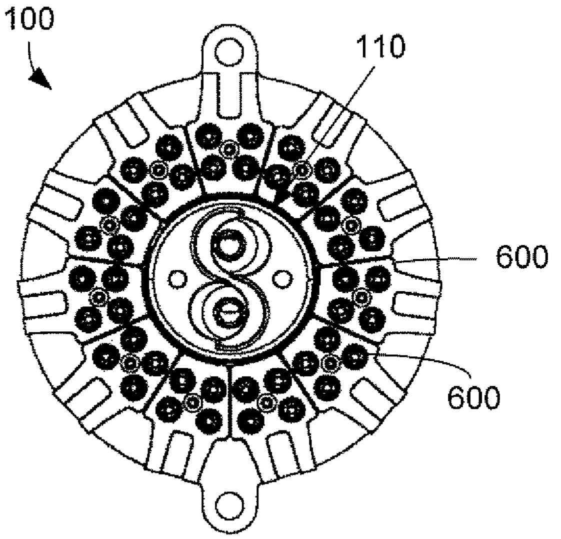
FIG. 2 is a top plan view of the dispensing nozzle assembly of FIG. 1.
Figure 1:
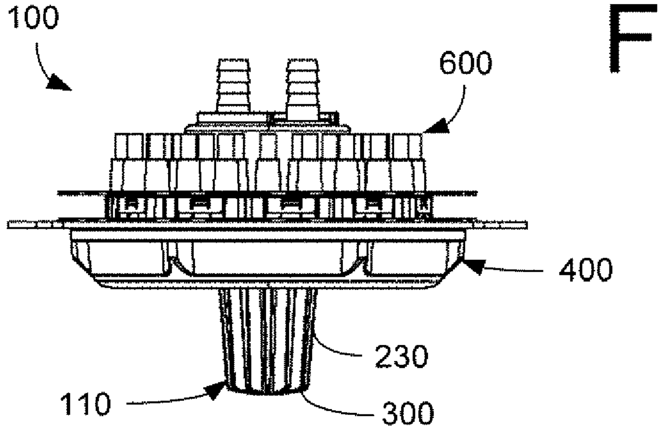
FIG. 1 is a side plan view of a dispensing nozzle assembly as is described herein.
Figure 3:
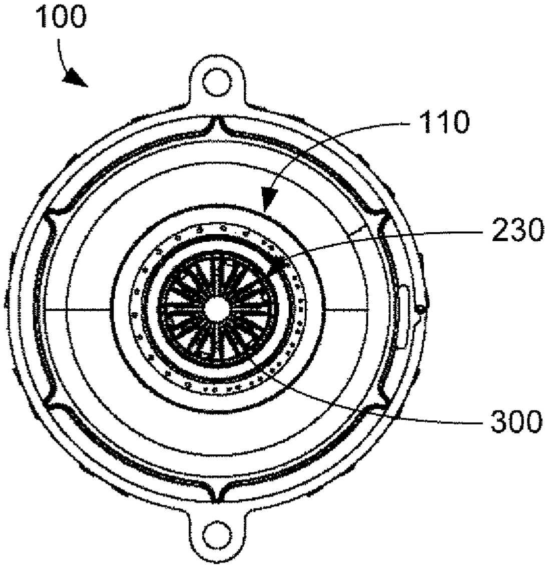
FIG. 3 is a bottom plan view of the dispensing nozzle assembly of FIG. 1.
Figure 4:
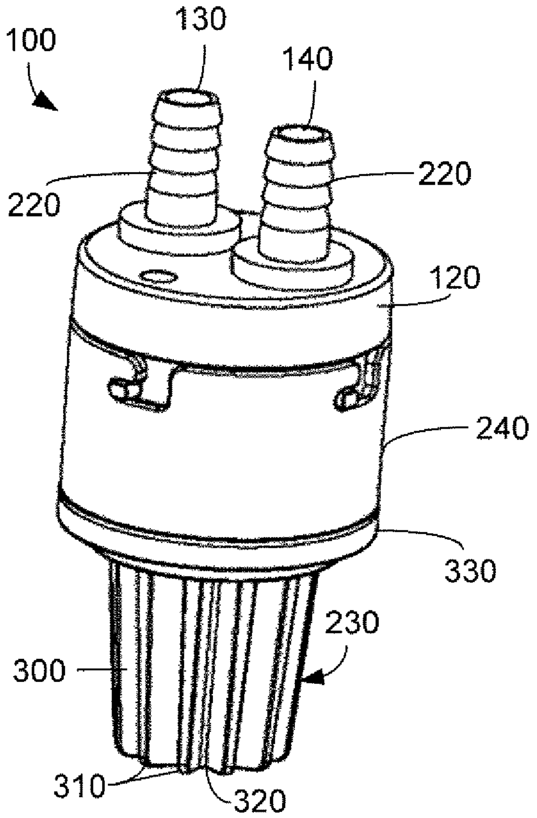
FIG. 4 is a perspective view of the nozzle tip assembly as used with the dispensing nozzle assembly of FIG. 1.
Figure 5:
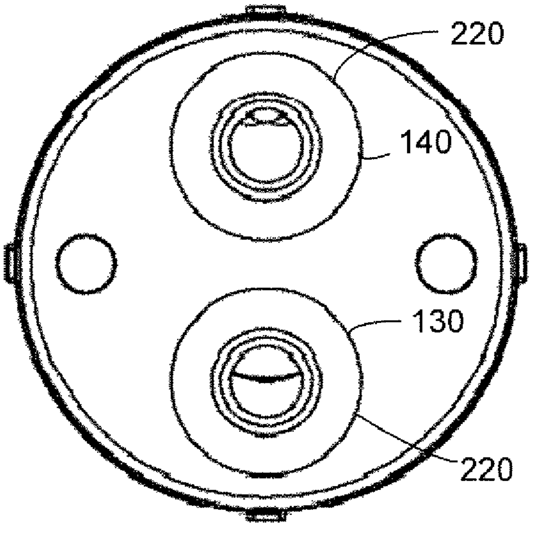
FIG. 5 is a top plan view of the nozzle tip assembly of FIG. 4.
Figure 6:
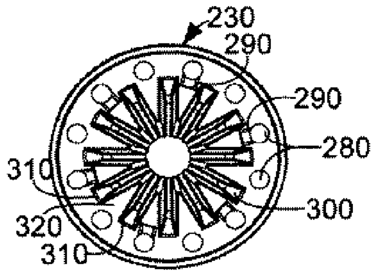
FIG. 6 is a bottom plan view of the nozzle tip assembly of FIG. 4.

Referring now to the drawings, in which like numerals refer to like elements throughout the several views, FIGS. 1-3 show an example of a dispensing nozzle assembly 100 as is described herein. The dispensing nozzle assembly 100 may be used as part of a beverage dispenser for dispensing many different types of beverages or other types of fluids. Specifically, the dispensing nozzle assembly 100 may be used with diluents, macro-ingredients, micro-ingredients, and other types of fluids. The diluents generally include plain water (still water or non-carbonated water), carbonated water, and other fluids.

Generally described, the macro-ingredients may have reconstitution ratios in the range from full strength (no dilution) to about six (6) to one (1) (but generally less than about ten (10) to one (1). The macro-ingredients may include sugar syrup, HFCS ("High Fructose Corn Syrup"), concentrated extracts, purees, and similar types of ingredients. Other ingredients may include dairy products, soy, and rice concentrates. Similarly, a macro-ingredient base product may include the sweetener as well as flavorings, acids, and other common components. The sugar, HFCS, or other macro-ingredient base product generally may be stored in a conventional bag-in-box container remote from the dispenser. The viscosity of the macro-ingredients may range from about 1 to about 10,000 centipoise and generally over 100 centipoises.

The micro-ingredients may have reconstitution ratios ranging from about ten (10) to one (1) and higher. Specifically, many micro-ingredients may have reconstitution ratios in the range of about 20:1 to 300:1 or higher. The viscosities of the micro-ingredients typically range from about one (1) to about six (6) centipoise or so, but may vary from this range. Examples of micro-ingredients include natural or artificial flavors; flavor additives; natural or artificial colors; artificial sweeteners (high potency or otherwise); antifoam agents, nonnutritive ingredients, additives for controlling tartness, e.g., citric acid or potassium citrate; functional additives such as vitamins, minerals, herbal extracts, nutricuticals; and over the counter (or otherwise) medicines such as pseudoephedrine, acetaminophen; and similar types of ingredients. Various types of alcohols may be used as either macro or micro-ingredients. The micro-ingredients may be in liquid, gaseous, or powder form (and/or combinations thereof including soluble and suspended ingredients in a variety of media, including water, organic solvents and oils).

The dispensing nozzle assembly 100 may include a nozzle tip assembly 110. An example of the nozzle tip assembly 110 is shown in FIGS. 4-9. The nozzle tip assembly 110 may include a main body 120. The main body 120 may be largely circular in shape and may have a number of conduits extending therethrough, in this case a first conduit 130 and a second conduit 140. The main body 120 also may have a lower central aperture 150. The central aperture 150 may be largely circular in shape.

The main body 120 may include a first port 160 in communication with the first conduit 130 and the central aperture 150. The first conduit 130 and the first port 160 may be used with a macro-ingredient line 165 such as for use with the HFCS. Likewise, the main body 120 may include an annular water chamber 170 that surrounds the bottom of the main body 120 and is in communication with the second conduit 140 via a water channel 175. The annular chamber 170 also may include one or more diversion channels 180 that extend into the central aperture 150. The diversion channels 180 may allow a small volume of fluid to be diverted from the annular chamber 170 into the central aperture 150 and the HFCS stream. The second conduit 140 may be in communication with the annular chamber 170 via a second port 190 positioned on top of the main body 120. The second conduit 140 and the second port 190 may be used with a diluent line 195 such as for use with water or other diluents.

Figure 7A:
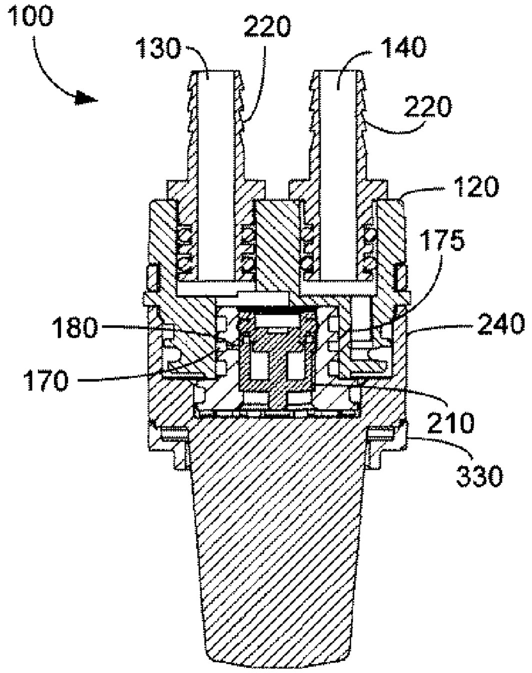
FIG. 7A is a side cross-sectional view of the nozzle tip assembly of FIG. 4.
Figure 7B:
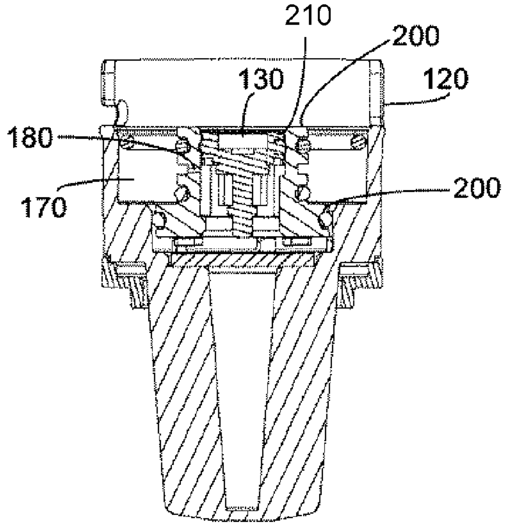
FIG. 7B is a further side cross-sectional view of the nozzle tip assembly of FIG. 4.
Figure 8:
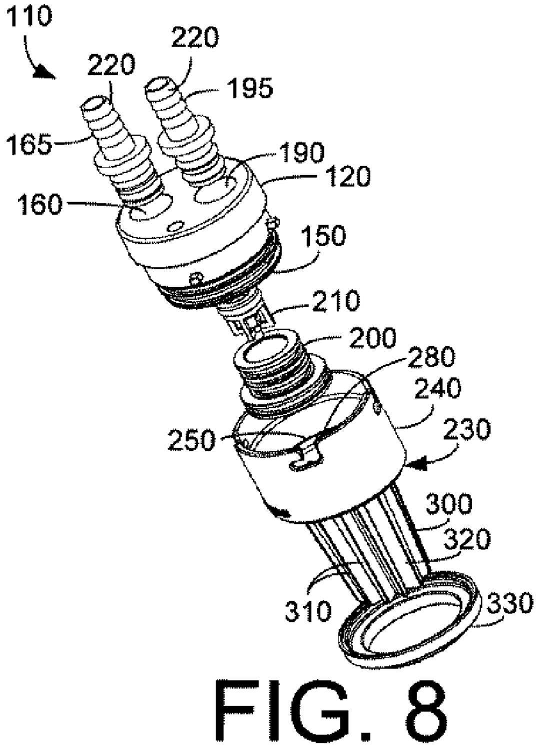
FIG. 8 is an exploded view of the nozzle tip assembly of FIG. 4.

As is shown in FIGS. 7A and 7B, a first stage mixture housing 200 and a check valve 210 may be positioned within the central aperture 150 of the main body 120. The check valve 210 prevents the HFCS from dripping so as to prevent carry over from one beverage to the next, particularly in the context of a HFCS drink to a diet drink. Further, the check valve 210 provides easy cleaning to the dispensing nozzle 100 as a whole in that the elements downstream of the check valve 210 may be removable for cleaning. The diversion channel 180 also may extend through the first stage mixer housing 200. A pair of nozzle fitments 220 may be positioned within the first port 160 and the second port 190.

Figure 9:
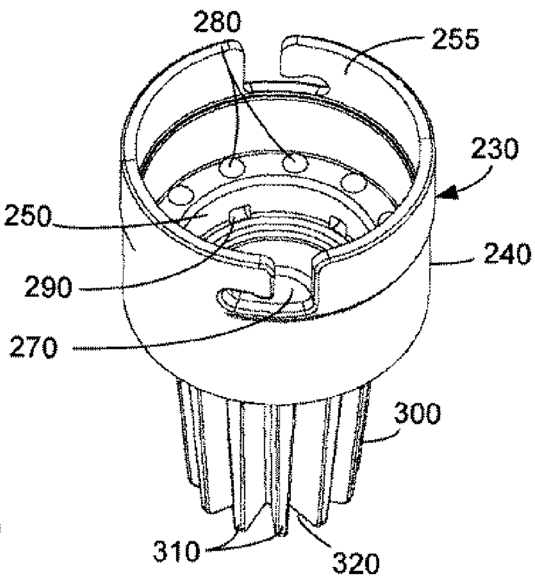
FIG. 9 is a perspective view of the upper chamber and the target of the nozzle tip assembly of FIG. 4.
Figure 10:
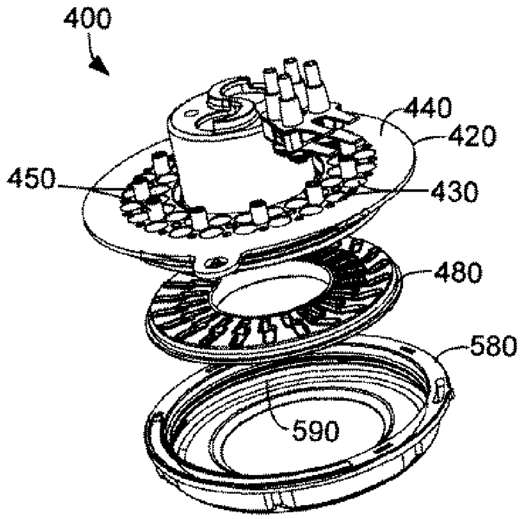
FIG. 10 is an exploded view of the injector plate assembly.

The nozzle tip assembly 110 also may include a flow director 230. An example of the flow director 230 is shown in FIG. 9. The flow director 230 may include an upper chamber 240. The upper chamber 240 may include a raised shelf 250 that encircles an inner wall 255 of the chamber 240. The upper shelf 250 extends from a bottom wall 270 of the chamber 240. A number of shelf apertures 280 may extend through the shelf 280 and out through the bottom of the chamber 240. Likewise, a number of floor apertures 290 may extend along the bottom wall 270 and connect with the shelf apertures 280. In this embodiment, there may be only about half as many floor apertures 290 as there are shelf apertures 280. Any number of apertures 280, 290, however, may be used.

The flow director 230 further may include a target 300. The target 300 may be positioned below the upper chamber 240. The target 300 may include a number of vertically extending fins 310 that extend into a largely star-shaped appearance as seen from the bottom. The fins 310 may form a number of U or V-shaped channels 320. The channels 320 may align with the shelf apertures 280 and the floor apertures 290 for fluid flow therethrough.

The nozzle tip assembly 110 further may include a lower ring 330. The lower ring 330 may surround the bottom of the upper chamber 240 and may be positioned partially underneath the shelf apertures 280 so as to deflect the streams therethrough towards the target 300.

The dispensing nozzle assembly 100 also may include an injector ring assembly 400. The injector ring assembly 400 may be positioned about the nozzle tip assembly 110. The injector ring assembly 400 may dispense a large number of different fluids. The nozzle tip assembly 110 may extend through a central aperture 410 of the injector ring 400. Other positions may be used herein.

Figure 11:
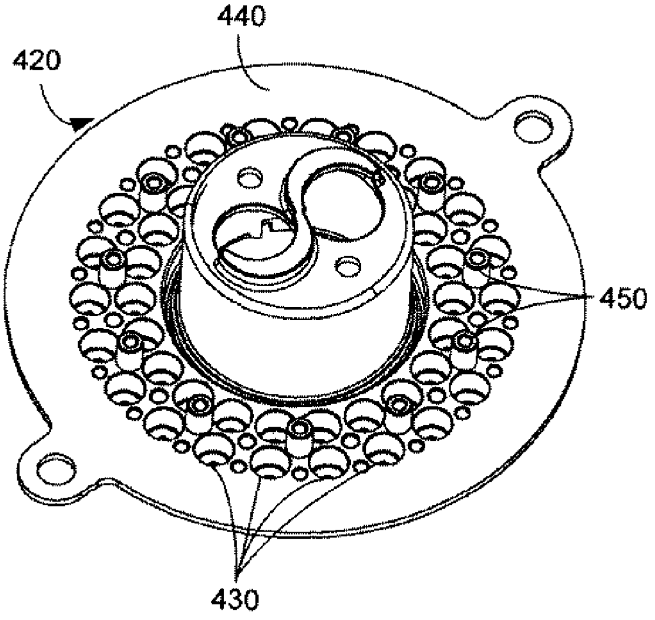
FIG. 11 is a perspective view of the top injector plate of the injector ring assembly of FIG. 10.
Figure 12:
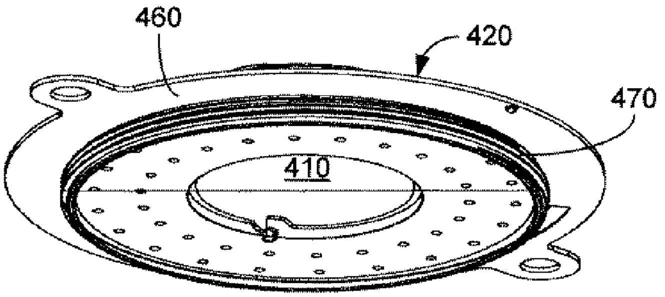
FIG. 12 is a bottom perspective view of the top injector plate of FIG. 11.

FIGS. 10-17 show one example of the injector ring assembly 400. FIGS. 11 and 12 show a top injector plate 420. The top injector plate 420 may be largely circular in shape. The top injector plate 420 may include a number of injector ports 430 positioned on a top side 440 thereof. In this example, forty-four (44) injector ports 430 are shown although any number of injector ports 430 may be used. The injector ports 430 may be used with a number of different micro-ingredients as will be described in more detail below. The top side 440 also includes a number of bosses 450 positioned thereon as also will be described in more detail below. Eleven (11) bosses 450 are show although any number may be used. In this example, one boss may be provided for every four (4) injector ports 430 although other configurations may be used.

The injector ports 430 extend through the top injector plate 420 to a bottom side 460 thereof. The bottom side 460 also may be largely circular in shape and may include a number of outer threads 470 for use as will be described in more detail below.

Figure 13:
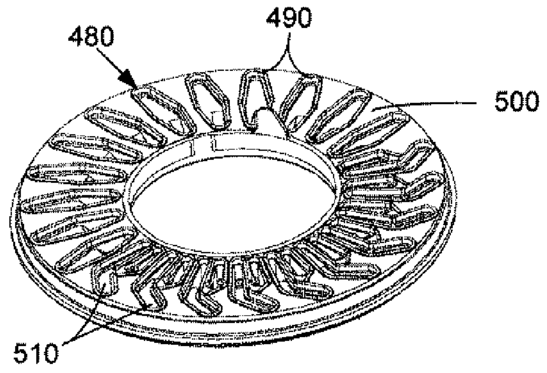
FIG. 13 is a top perspective view of the lower injector plate of the injector ring assembly of FIG. 10.
Figure 14:
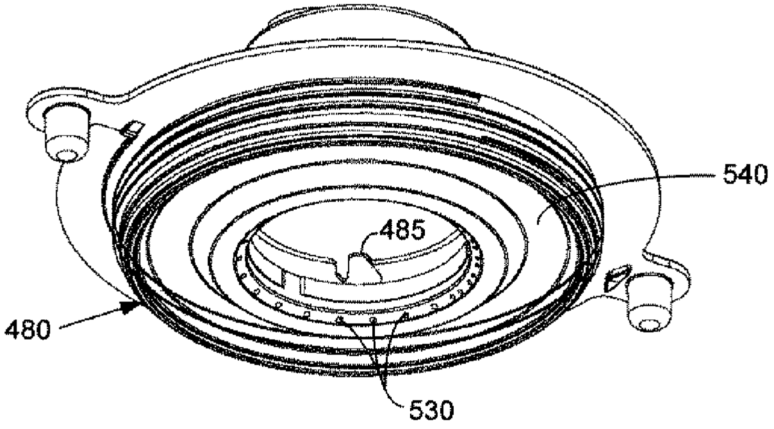
FIG. 14 is a lower perspective view of the lower injector plate of FIG. 13.

As is shown in FIGS. 13-14, a lower injector plate 480 may mate with the top injector plate 420. The lower injector plate 480 also may be largely circular in shape. The lower injector plate 480 may have a number of dispensing cavities 490 on a top side 500 thereof. Each or several of the dispensing cavities 490 may be elongated such that each cavity 490 may mate with two or more of the injector ports 430 of the top injector plate 420. The cavities 490 may be configured to ensure that the fluid from the desired group of injector ports 430 is combined. Several of the cavities 490 also may be used with a single fluid and a single injector port 490. Likewise, a single type of fluid may use multiple ports 490. As is described in more detail below, the larger cavities 490 may be used with beverage brands while the smaller cavities 490 may be used with additives or other types of fluids. The configuration of the lower injection plate 420 may be changed depending upon the desired beverages. A replacement lower injector plate 420 may be easily inserted.

FIG. 14 also shows the lower injector plate 480 that may include a key 485. The key 485 may mate with a similar structure that may form part of the top injector plate or otherwise. The use of the key 485 insures that the respective plate 420, 480 are properly aligned when assembled.

Figure 15:
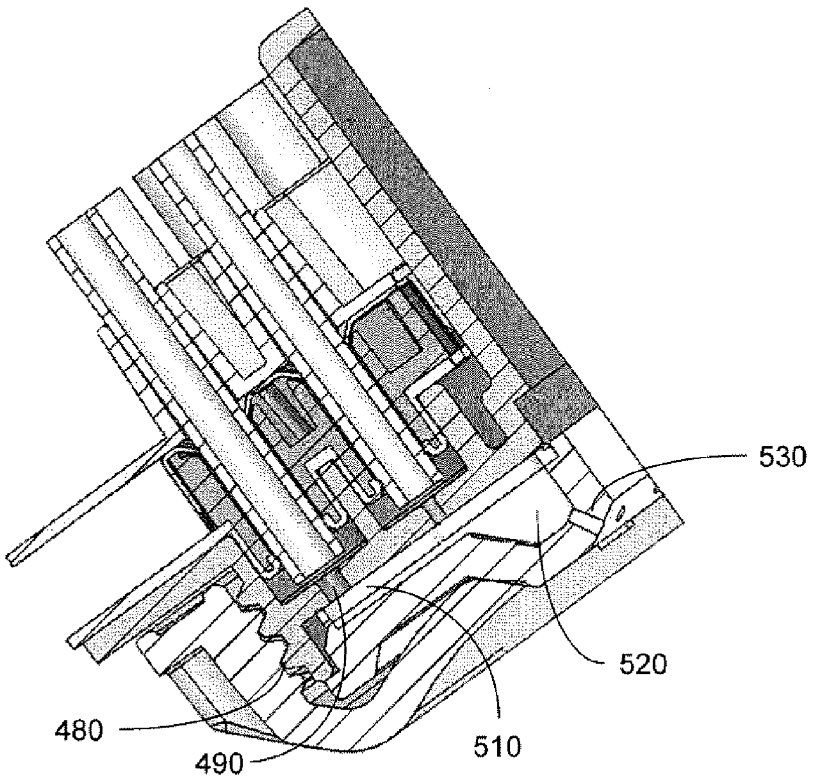
FIG. 15 a side cross-sectional view of the lower injector plate of FIG. 13.

As is shown in FIG. 15, each or several of the dispensing cavities 490 may include a top channel 510, a lower mixing area 520, and an exit port 530. The fluid from the injector ports 490 enters the cavity 490 via the top channel 510 and then mixes in the lower mixing area 520. The mixed fluids then leave the cavity 490 via the exit port 530. Thirty (30) exit ports 530 are shown although any number may be used. The exit ports 530 may be positioned on a bottom side 540 of the lower injection plate 480.

Figure 16:
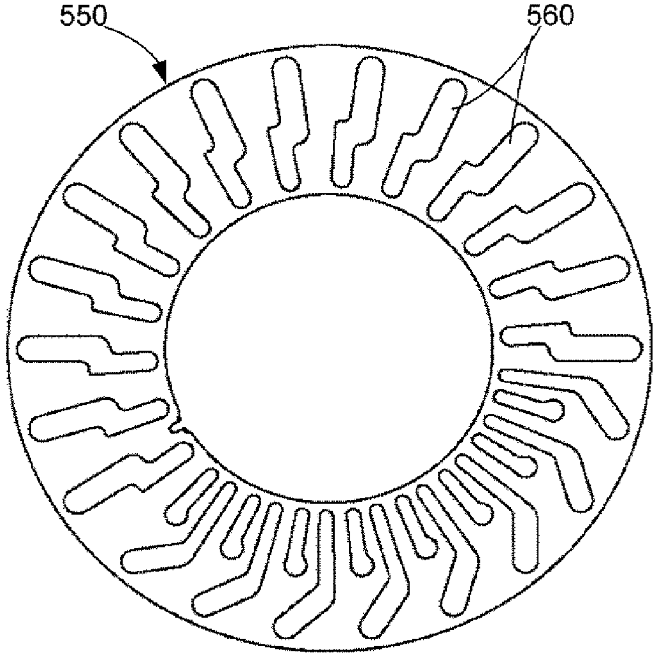
FIG. 16 is a top plan view of the injector ring gasket of the injector ring assembly of FIG. 10.

As is shown in FIG. 16, a gasket 550 may be positioned between the top injector plate 320 and the lower injector plate 480. The gasket 550 may be made out of elastomeric material. The gasket 550 may be a distinct element or it may be comolded with either the top injector plate 320 or the lower injector plate 480. The gasket 550 may include a number of dispensing cavity apertures 560. The dispensing cavity apertures 560 may be substantially similar in shape to the dispensing cavities 490 of the lower injector plate 480 and may align therewith.

Figure 17:
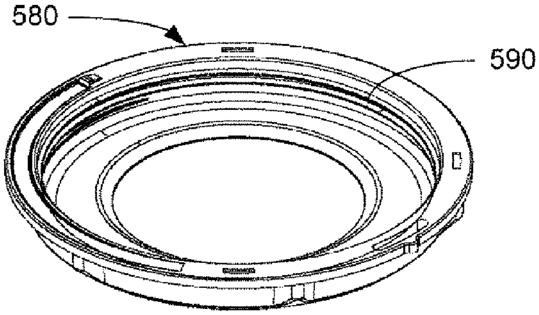
FIG. 17 is a perspective view of the lower injector ring collar of the injector ring assembly of FIG. 10.

The injector ring assembly 400 also may include a lower injector ring collar 580 as is shown in FIG. 17. The lower injector collar 580 includes a number of lower injector ring collar threads 590 thereon. The lower injector ring collar threads 590 mate with the top injector plate threads 470 and the lower injector plate threads 550 so at form the completed injector ring assembly 500. The injector ring assembly 500 likewise may be unscrewed and taken apart for cleaning, replacement, and the like.

Figure 18:
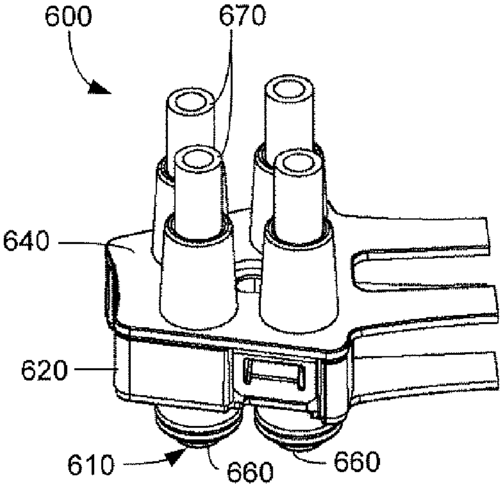
FIG. 18 is a perspective view of the quad tube assembly.
Figure 19:
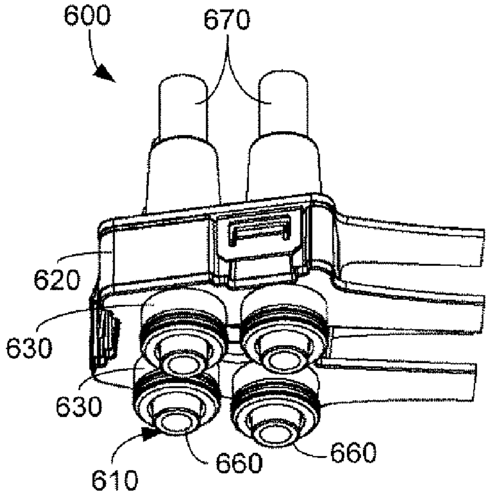
FIG. 19 is a bottom perspective view of the quad tube assembly of FIG. 17.
Figure 20:
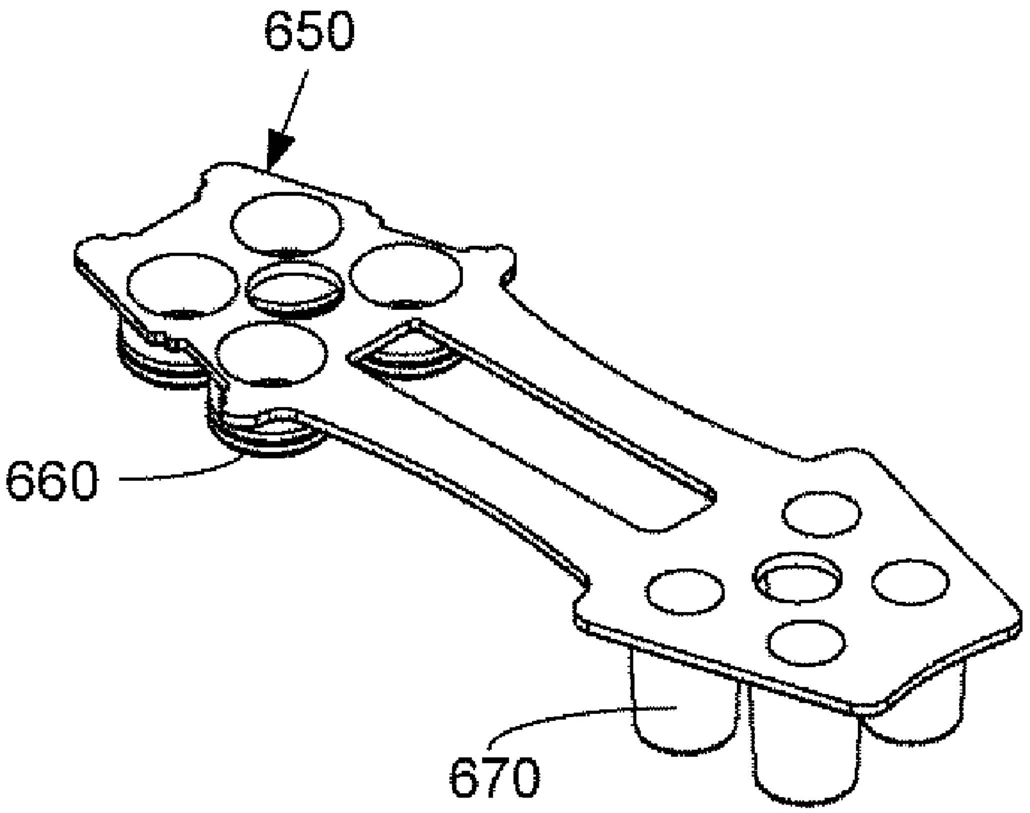
FIG. 20 is a perspective view of the quad tube adapter elastomer of the quad tube assembly of FIG. 17.

The dispensing nozzle assembly 100 further may include a number of quad tube assemblies 600. An example of the quad tube assembly 600 is shown in FIGS. 18-20. As the name implies, each quad tube assembly 600 may provide mating means for four (4) ingredient tubes 610 to mate with four injector ports 430 of the injector ring assembly 400. Individual connections and/or other groupings of tubes 610 also may be used herein (e.g., one tube, three tubes, five tubes, etc.). Each quad tube assembly 610 may include a quad tube adapter body 620 with four (4) adapter body ports 630 therein. The quad tube adapter 620 may be enclosed by a quad tube retainer 640. The connection means may be provided by a quad tube adapter elastomer 650. The quad tube elastomer 650 may be molded as a single piece as is shown in FIG. 19 and then cut in half. One-half of the quad tube elastomer 640 includes the connectors 660 for the injector ports 430 while the other half includes the top connectors 670 for the ingredient tubes 610. Other materials may be used herein.

As described above, the dispensing nozzle assembly 100 may be used with diluents, macro-ingredients, micro-ingredients, and other materials. The first port 160 of the nozzle tip assembly 110 may be in communication with the HFCS line 165. Alternatively, a sugar syrup or other type of macro-ingredient may be used. Likewise, the second port 190 of the nozzle tip assembly 110 may be in communication with the diluent line 195. As above, the diluent may be plain water or carbonated water. A plain water line and a carbonated water line may merge upstream of the dispensing nozzle assembly 100. Each of the injector ports 430 may be in communication with one of the ingredient tubes 610 via the quad tube adapters 620. As described above, each of the ingredient tubes 610 may be in communication with a micro-ingredient source or other type of material source.

The micro-ingredients may include beverage concentrate, such as for teas, soft drinks, sport drinks, fruit drinks, and the like as well as flavorings such as cherry, lemon, etc. and also other ingredients such as anti-foam additives. The ingredient tubes 610 on the injector ring 400 preferably may be arranged such that the darker micro-ingredients are positioned at the front of the dispensing nozzle assembly 100 while the substantially clear ingredients and the additives may be positioned at the rear and the side of the dispensing nozzle assembly 100. By placing the lighter colored brands in back, the consumer generally will not see any off color fluid streams as the various fluid streams flow through the dispensing nozzle assembly 100 and into a consumer's cup.

Many of the brands that flow through the dispensing nozzle assembly 100 may be combinations of several components. For example, a soft drink may have a first component and a second component. These components may be, for example, acid and non-acid components. An example of such is shown in commonly owned U.S. patent application Ser. No. 11/276,553 entitled "Methods and Apparatuses for Making Compositions Comprising an Acid and an Acid Degradable Component and/or Compositions a Plurality of Selectable Components." U.S. patent application Ser. No. 11/276,553 is incorporated herein by reference.

These acid and non-acid components generally should not be mixed upstream of dispensing nozzle assembly 100 so as to delay degradation. The acids and the non-acid flavor components therefore may be separated until they reach the injector ring assembly 400. The two components may flow from the injector ports 430 and into the dispensing cavities 490 via the top channel 510, mix in the mixing area 520, and exit via the exit port 530. The mixed streams then may mix with the water and sweetener about the target 300. Carry over in the next beverage is largely limited by the fact that the streams largely air mix. Use of the two streams also limits the possibility that an exit port 530 will clog and there is again less opportunity for color or flavor carryover because only one exit port 530 is used for each injector port 430.

In use, the components of the base beverage flow through the injector ring assembly 400 as described above. Likewise, other injector ports 430 may be activated so as to add additives such as flavors, anti foam agents, and other types of micro-ingredients. While the micro-ingredients are flowing, the water or other diluent and the sweetener or other macro-ingredient may flow through the nozzle tip assembly 110. For example, the HFCS flows through the first port 160 and through the lower central aperture 150 via the check valve 210 while the water generally flows through the second conduit 190 and into the annular chamber 170.

The HFCS stream that enters the first port 160 is generally above about sixty-five percent (65%) in concentration. Such concentrations and higher generally ensure an uncontaminated supply. (The concentration may be less, about fifty percent (50%), if preservatives or aseptic loading is used.) In order to provide for good mixing, however, a small amount of the water stream is diverted from the annular chamber 170 via the diversion channel 180 towards the lower central aperture 150 and the HFCS stream therein. This diversion slightly dilutes the HFCS stream by about five percent (5%) or more, with about twenty percent (20%) or so shown herein, and brings the HFCS stream to a concentration of less than about sixty-five percent (65%). The water stream then exits the nozzle tip assembly 110 via the shelf apertures 280 while the diluted HFCS stream exits via the floor apertures 290 and into the shelf apertures 280. The water stream and the diluted HFCS stream then mix with the micro-ingredients as they flow down the target 300.

The use of the diluted HFCS stream simplifies sanitation in that those areas that are exposed to HFCS below a sixty-five percent (65%) concentration can be sanitized. The predilution also provides good mixing performance and good carbonation even using a high brix HFCS. Likewise, there is minimal carryover in that the potential for HFCS to be washed into the following drink after a dispense is minimal.

The dispensing nozzle assembly 100 thus may provide any number of different and varying beverages in a small foot print. The dispensing nozzle assembly 100 provides good mixing while having limited carryover. The dispensing nozzle assembly 100, and the nozzle tip assembly 110 in particular, also are easy to clean.

It should be apparent that the forgoing relates only to the preferred embodiments of the present application and that numerous changes and modifications may be made herein by one of ordinary skill in the art without departing from the general spirit and scope of the invention as defined by the following claims and the equivalents thereof.

I claim:

1. A method for mixing a sweetener stream and a diluent stream, comprising:

flowing the sweetener stream;

flowing the diluent stream;

diverting a partial volume of the diluent stream to the sweetener stream to form a diluted sweetener stream;

mixing the diluent stream and the diluted sweetener stream;

mixing a plurality of beverage base components to form a mixed base stream; and mixing the mixed base stream and the diluted sweetener stream.

2. The method of claim 1, wherein the beverage base components comprise an acid and a non-acid component.

3. The method of claim 1, wherein the beverage base components comprise flavorings and/or additives.

4. The method of claim 1, wherein the sweetener stream comprises a high fructose corn syrup stream.

5. The method of claim 4, wherein the partial volume of the diluent stream dilutes the sweetener stream by about five percent (5%) to twenty percent (20%) or more.

6. The method of claim 1, wherein the diluted sweetener stream comprises a diluted high fructose corn syrup stream and wherein the diluted high fructose corn syrup stream comprises a concentration of less than about sixty-five percent (65%).

7. A method for mixing a sweetener stream and a diluent stream, comprising:

flowing the sweetener stream, flowing the diluent stream, diverting a partial volume of the diluent stream to the sweetener stream to form a diluted sweetener stream; and mixing the diluent stream and the diluted sweetener stream;

wherein the sweetener stream comprises a high fructose corn syrup with a concentration above about sixty-five percent (65%).

8. A method for mixing a concentrate stream of a plurality of beverage base components and a diluent stream, comprising:

flowing the concentrate stream;

flowing the diluent stream;

diverting a partial volume of the diluent stream to the concentrate stream to form a diluted concentrate stream; and mixing the diluent stream and the diluted concentrate stream, wherein the concentrate stream comprises.

9. The method of claim 8, wherein the concentrate stream comprises a high fructose corn syrup stream.

10. The method of claim 9, wherein the high fructose corn syrup stream comprises a concentration above about sixty-five percent (65%).

11. The method of claim 8, wherein the partial volume of the diluent stream dilutes the concentrate stream by about five percent (5%) to twenty percent (20%) or more.

12. The method of claim 8, wherein the diluted concentrate stream comprises a diluted high fructose corn syrup stream and wherein the diluted high fructose corn syrup stream comprises a concentration of less than about sixty-five percent (65%).

* * * * *